United States Patent [19]
Saito et al.

[11] Patent Number: 5,728,201
[45] Date of Patent: Mar. 17, 1998

[54] INK, AND INK-JET RECORDING METHOD AND INSTRUMENTS USING THE SAME

[75] Inventors: Eriko Saito, Fujisawa; Mayumi Yamamoto; Ryuji Katsuragi, both of Tokyo, all of Japan

[73] Assignee: Canon Kabushiki Kaisha, Tokyo, Japan

[21] Appl. No.: 713,227

[22] Filed: Sep. 12, 1996

[30] Foreign Application Priority Data

Sep. 14, 1995 [JP] Japan .................................. 7-262186

[51] Int. Cl.$^6$ .................................................. C09D 11/02
[52] U.S. Cl. .................. 106/31.48; 106/31.5; 106/31.52
[58] Field of Search ........................ 106/31.48, 31.5, 106/31.52

[56] References Cited

U.S. PATENT DOCUMENTS

| | | | |
|---|---|---|---|
| 4,605,442 | 8/1986 | Kawashita et al. | 106/31.48 |
| 4,661,158 | 4/1987 | Kobayashi et al. | 106/31.48 |
| 5,006,128 | 4/1991 | Pedrazzi | 106/31.48 |
| 5,082,496 | 1/1992 | Yamamoto et al. | 106/22 |
| 5,123,960 | 6/1992 | Shirota et al. | 106/22 |
| 5,127,946 | 7/1992 | Eida et al. | 106/22 |
| 5,130,723 | 7/1992 | Yamamoto et al. | 346/1.1 |
| 5,167,703 | 12/1992 | Eida et al. | 106/22 K |
| 5,178,671 | 1/1993 | Yamamoto | 106/22 K |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,258,505 | 11/1993 | Eida et al. | 534/680 |
| 5,262,527 | 11/1993 | Gregory et al. | 106/31.48 |
| 5,268,459 | 12/1993 | Gregory et al. | 106/31.48 |
| 5,374,301 | 12/1994 | Gregory et al. | 106/31.48 |
| 5,439,517 | 8/1995 | Yoshida et al. | 106/31.52 |
| 5,451,251 | 9/1995 | Mafune et al. | 106/31.48 |
| 5,482,545 | 1/1996 | Aoki et al. | 106/22 K |
| 5,616,694 | 4/1997 | Kenyon et al. | 106/31.48 |
| 5,622,550 | 4/1997 | Konishi et al. | 106/31.48 |

FOREIGN PATENT DOCUMENTS

| | | |
|---|---|---|
| 0468647A1 | 1/1992 | European Pat. Off. . |
| 3-6193 | 12/1985 | Japan . |
| 61-2771 | 1/1986 | Japan . |
| 5-194890 | 8/1993 | Japan . |

*Primary Examiner*—Helene Klemanski
*Attorney, Agent, or Firm*—Fitzpatrick, Cella, Harper & Scinto

[57] ABSTRACT

Disclosed herein is a yellow ink comprising at least two yellow dyes and a liquid medium dissolving or dispersing the dyes therein, wherein the ink comprises a dye represented by the following general formula (1) in the state of a free acid, and a yellow dye having a $SO_3H$ group as a main solubilizing group in the state of a free acid and having its position in the $L^*a^*b^*$ chromaticity diagram at $b^* = xa^*$ ($3 \leq x \leq \infty$):

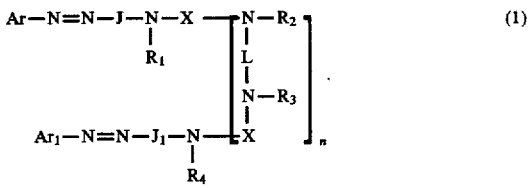

(1)

37 Claims, 3 Drawing Sheets

INK, AND INK-JET RECORDING METHOD AND INSTRUMENTS USING THE SAME

BACKGROUND OF THE INVENTION

1. Field of the Invention

The present invention relates to an ink, and an ink-jet recording method, instruments and recording apparatus using such an ink.

2. Related Background Art

Inks with greatly various manners of being composed have heretofore been reported in respect of inks for ink-jet, and various investigations have been made on the reliability as to ink-jet. Nowadays, printers are required to permit high-speed printing. With such a requirement, inks are also required to have good high-frequency responsiveness. Besides, inks for ink-jet are required to have better reliability (from the viewpoint of ecology) because the life of heads is extended. In addition, the inks are also required to have properties that images having high water fastness can be provided on, in particular, so-called plain paper such as neutralized paper, and good color tone must be achieved in color images.

References are given to, in particular, yellow inks. An ink using C.I. Direct Yellow 86 has been proposed in Japanese Patent Publication No. 3-6193. According to this ink, considerable improvements are recognized on the storage stability and crusting of the ink. However, the ink involves a drawback that its ejection property becomes unstable when conducting continuous printing. In addition, images formed on plain paper with the ink are insufficient in water fastness and color tone. Japanese Patent Application Laid-Open Nos. 5-194890 and 61-2771 have proposed, respectively, a yellow ink comprising C.I. Direct Yellow 86 and C.I. Acid Yellow 23, and a yellow ink comprising a dye represented by the general formula wherein $M_1$ and $M_2$ may be identical with or different from each other and are independently hydrogen, an alkali metal, ammonium or organic amino group, and X is an alkylamine or alkoxyalkylamine residue having 6 to 18 carbon atoms. Both inks provide images having good color tone, but are also insufficient in water fastness of images formed on plain paper.

EP 0468647A1 has proposed yellow dyes having excellent water fastness. When inks comprising these water-fast dyes are used in an ink-jet printer, the water fastness of the resulting image is improved. On the other hand, print irregularity or ejection failure may be caused due to the crusting of the inks within nozzles. In addition, the inks also involve a problem that printing is disordered while conducting continuous printing, and so their ejection properties become unstable.

As described above, any yellow ink, which satisfies reliability as to ink-jet such as print quality upon continuous printing, and also the water fastness of the resulting image, and provides images having good color tone, has not been yet discovered.

SUMMARY OF THE INVENTION

It is accordingly an object of the present invention to provide a yellow ink which satisfies reliability as to various properties such as print quality when conducting continuous printing in an ink-jet recording apparatus and storage stability without the least problem, and can provide images good in both water fastness and color tone on plain paper, and an ink-jet recording method and instruments using such an ink.

The above object can be achieved by the present invention described below.

According to the present invention, there is thus provided a yellow ink comprising at least two yellow dyes and a liquid medium dissolving or dispersing the dyes therein, wherein the ink comprises a dye represented by the following general formula (1) in the state of a free acid, and a yellow dye having a $SO_3H$ group as a main solubilizing group in the state of a free acid and having its position in the $L^*a^*b^*$ chromaticity diagram at $b^*=xa^*$ ($3 \leq x \leq \infty$):

wherein Ar and $Ar_1$ are independently an aryl group or a substituted aryl group, at least one of which has at least one substituent group selected from the group consisting of COOH and COSH, J and $J_1$ are independently a group selected from the group consisting of groups represented by the general formulae and (4)

in which $R_5$ is a radical selected from the group consisting of H, alkyl groups, substituted alkyl groups, alkoxy groups, halogens, CN, a ureido group and $NHCOR_6$ ($R_6$ being a radical selected from the group consisting of H, alkyl groups, substituted alkyl groups, aryl groups, substituted aryl groups, aralkyl groups and substituted aralkyl groups), T is an alkyl group, W is a radical selected from the group consisting of H, CN, $CONR_{10}R_{11}$, pyridinium and COOH, (m) is an alkylene chain having 2 to 8 carbon atoms, and B is a radical selected from the group Consisting of H, alkyl groups and COOH, $R_1$, $R_2$, $R_3$, $R_4$, $R_{10}$ and $R_{11}$ are independently a radical selected from the group consisting of H, alkyl groups and substituted alkyl groups, L is a divalent organic bonding group, n is 0 or 1, X is a carbonyl group or a group selected from the group consisting of groups represented by the general formulae (5)

(6)

and (7)

in which Z is a group selected from the group consisting of $OR_7$, $SR_7$ and $NR_8SR_9$, Y is a radical selected from the group consisting of H, Cl, CN and Z, E is a radical selected from the group consisting of Cl and CN, and $R_7$, $R_8$ and $R_9$ are independently a radical selected from the group consisting of H, alkenyl groups, substituted alkenyl groups, alkyl groups, substituted alkyl groups, aryl groups, substituted aryl groups, aralkyl groups and substituted aralkyl groups, or $R_8$ and $R_9$ form a 5- or 6-membered ring together with the nitrogen atom to which they are bonded, with the proviso that (1) Ar and $Ar_1$ have at least two groups selected from COOH and COSH where they have no $SO_3H$ group, or (2) Ar and $Ar_1$ have groups selected from COOH and COSH of at least the same number as the number of $SO_3H$ groups where they have one or more $SO_3H$ groups.

According to the present invention, there is also provided an ink-jet recording method comprising ejecting an ink out of an orifice in accordance with recording signals to conduct recording on a recording medium, wherein said ink is the ink described above.

According to the present invention, there is further provided a recording unit comprising an ink container portion with an ink held therein and a head from which the ink is ejected, wherein said ink is the ink described above.

According to the present invention, there is still further provided an ink cartridge comprising an ink container portion with an ink held therein, wherein said ink is the ink described above.

According to the present invention, there is yet still further provided an ink-jet recording apparatus comprising a recording unit having an ink container portion with an ink held therein and a head from which the ink is ejected, wherein said ink is the ink described above.

According to the present invention, there is yet still further provided an ink-jet recording apparatus comprising a recording head for ejecting an ink, an ink cartridge having an ink container portion with the ink held therein, and an ink feeder for feeding the ink from the ink cartridge to the recording head, wherein said ink is the ink described above.

DESCRIPTION OF THE PREFERRED EMBODIMENTS

The present invention will hereinafter be described in detail.

The present inventors have carried out an extensive investigation as to various manners of ink compositions. As a result, it has been found that a yellow ink composed of a liquid medium containing at least two yellow dyes, wherein a dye represented by the general formula (1) in the state of a free acid is used in combination with a yellow dye having a $SO_3H$ group as a main solubilizing group in the state of a free acid and having its position in the L*a*b* chromaticity diagram at b*=xa* ($3 \leq x \leq \infty$), has good reliability as to ejection stability when conducting continuous printing and long-term storage stability, and can provide images good in both water fastness and color tone.

This is considered to be attributable to the fact that when a single dye is used in an ink, the dye tends to form micelles, while when dyes different from each other in structure coexist in an ink, a synergistic effect occurs between them, so that they are unlikely to form micelles and always remain stably dissolved in the ink. Therefore, such an ink may be improved in reliability as to ejection stability when conducting continuous printing and ejection stability after being stored for a long period of time. In particular, it has been found that a dye represented by the general formula (1) can achieve good reliability (as to ejection stability when conducting continuous printing, ejection stability after being stored for a long period of time, etc.) by using it in combination with a yellow dye having a $SO_3H$ group as a main solubilizing group in the state of a free acid and having its position in the L*a*b* chromaticity diagram at b*=xa* (3≦x≦∞). This level of reliability cannot be achieved by the dye represented by the general formula (1) alone, and besides, the combined use permits the provision of images good in both water fastness and color tone.

For example, when a yellow ink comprising the dye represented by the general formula (1) and the yellow dye having a SO₃H group as a main solubilizing group in the state of a free acid and having its position in the L*a*b* chromaticity diagram at b*=xa* (3≦x≦∞) is used and a* is made near 0, color tones of red and green, which are secondary colors, can also be improved, to say nothing of preferable yellow, and moreover, the reliability as to print quality when conducting continuous printing, long-term storage stability, etc. can be more improved than when producing, for example, a tint of a* being near 0 by using one kind of dye.

When the yellow dye having a SO₃H group as a main solubilizing group in the state of a free acid and having its position in the L*a*b* chromaticity diagram at b*=xa* (3≦x≦∞) is a dye having a symmetrical structure inserted with an organic bonding group, the dye is better balanced and becomes stable in structure. It is hence considered that the reliability is more enhanced. It has also been found that among such dyes, a yellow dye represented by the general formula (8), which will be described subsequently, is most compatible with the dye represented by the general formula (1) and is excellent for the combined use with the dye represented by the general formula (1) taking a balance between the reliability as to ejection stability and the like, and water fastness, color tone and the like into consideration.

It has further found that when a monovalent alkali metal not contained in the dyes is added to the ink, the balance between the reliability as to ejection stability and the like, and water fastness is more improved. The reason for it is considered to be that the alkali metal not contained in the dyes acts as a counter ion to the dyes, and some synergistic effect thus takes place.

The present invention will hereinafter be described in more detail by preferred embodiments.

The ink according to the present invention is an ink comprising at least two yellow dyes and a liquid medium dissolving or dispersing the dyes therein, wherein the ink comprises a dye represented by the following general formula (1) in the state of a free acid, and a yellow dye having a SO₃H group as a main solubilizing group in the state of a free acid and having its position in the L*a*b* chromaticity diagram at b*=xa* (3≦x≦∞).

In the general formula (1), Ar and Ar₁ are independently an aryl group or a substituted aryl group, at least one of which has at least one substituent group selected from the group consisting of COOH and COSH, J and J₁ are independently a group selected from the group consisting of groups represented by the general formulae (2)

(3)

and (4)

wherein R₅ is a radical selected from the group consisting of H, alkyl groups, substituted alkyl groups, alkoxy groups, halogens, CN, a ureido group and NHCOR₆ (R₆ being a radical selected from the group consisting of H, alkyl groups, substituted alkyl groups, aryl groups, substituted aryl groups, aralkyl groups and substituted aralkyl groups), T is an alkyl group, W is a radical selected from the group consisting of H, CN, CONR₁₀R₁₁, pyridinium and COOH, (m) is an alkylene chain having 2 to 8 carbon atoms, and B is a radical selected from the group consisting of H, alkyl groups and COOH. R₁, R₂, R₃, R₄, R₁₀ and R₁₁ are independently a radical selected from the group consisting of H, alkyl groups and substituted alkyl groups. L is a divalent organic bonding group, n is 0 or 1, X is a carbonyl group or a group selected from the group consisting of groups represented by the general formulae (5)

(6)

and (7)

in which Z is a group selected from the group consisting of OR₇, SR₇ and NR₈R₉, Y is a radical selected from the group consisting of H, Cl, CN and Z, E is a radical selected from the group consisting of Cl and CN, and R₇, R₈ and R₉ are independently a radical selected from the group consisting of H, alkenyl groups, substituted alkenyl groups, alkyl groups, substituted alkyl groups, aryl groups, substituted aryl groups, aralkyl groups and substituted aralkyl groups, or $R_8$ and $R_9$ form a 5- or 6-membered ring together with the nitrogen atom to which they are bonded, with the proviso that (1) Ar and $Ar_1$ have at least two groups selected from COOH and COSH where they have no $SO_3H$ group, or (2) Ar and $Ar_1$ have groups selected from COOH and COSH of at least the same number as the number of $SO_3H$ groups where they have one or more $SO_3H$ groups.

Preferred dyes among the dyes represented by the general formula (1) will now be described.

Dyes represented by the general formula (1), which each have at least one $SO_3H$ group as a water-soluble group and at least the same number of COOH groups as the number of $SO_3H$ groups in the dye, are preferred.

Dyes represented by the general formula (1), which each have no $SO_3H$ group and contain at least two COOH groups, are preferred.

Dyes represented by the general formula (1), which each have at least three COOH groups, are preferred.

Preferred dyes represented by the general formula (1) are those of a structure that at least one of Ar and $Ar_1$ has at least one COOH group.

Preferred dyes represented by the general formula (1) are those of a structure that Ar and $Ar_1$ each have at least one COOH group.

Preferred dyes represented by the general formula (1) are those of a structure that Ar and $Ar_1$ each have at least two COOH groups.

Preferred dyes represented by the general formula (1) are those of a structure that both Ar and $Ar_1$ are dicarboxyphenyl groups.

Preferred dyes represented by the general formula (1) are those of a structure that X is a group represented by the general formula (5), and Z in the general formula (5) is a group selected from the group consisting of $NHC_2H_4OH$, $N(C_2H_4OH)_2$, NHR (R being an alkyl group having 1 to 6 carbon atoms) and a morpholino group.

Preferred dyes represented by the general formula (1) are those each having a counter ion selected from the group consisting of ammonium and alkylamino ions.

Specific examples of particularly preferred dyes represented by the general formula (1) are given below, to which, however, the invention is not limited.

Dye (1):

Dye (2):

-continued

Dye (3):

Dye (4):

Dye (5):

Dye (6):

$X = NHCH_2CH_2OH$

-continued

Dye (7):

Dye (8):

X = morpholino

Dye (9):

X = morpholino

Dye (10):

X = morpholino

Dye (11):

and

Dye (12):

Another dye used in the present invention is a yellow dye having a SO₃H group as a main solubilizing group in the state of a free acid and having its position in the L*a*b* chromaticity diagram at b*=xa* ($3 \leq x \leq \infty$). Examples of such a dye include C.I. Direct Yellow 86 and C.I. Acid Yellow 36. Preferred yellow dyes are dyes each having a symmetrical structure inserted with an organic bonding group, with dyes represented by the following general formula (8) in the state of a free acid being particularly preferred.

($X_1$: a sulfonic group; $X_2$ and $X_3$: a radical selected from the group consisting of carboxyl, hydroxyl and amino groups, and hydrogen, at least one of $X_2$ and $X_3$ having a SO₃H group).

Of the dyes represented by the general formula (8), those in which $A_1$ is $CH_3$, and $B_1$ is wherein $A_1$ is $C_nH_{2n+1}$ or $OC_nH_{2n+1}$ (n: an integer of 1 to 5), and $B_1$ is ($X_1$ having the same meaning as defined above) are preferred taking the compatibility with the dyes represented by the general formula (1) into consideration. Such a combination is the most preferable combination from the overall consideration of the properties of ink such as the water fastness and color tone, to say nothing of the reliability as to the ejection stability and the like.

Examples of such yellow dyes include yellow dyes having their position in the L*a*b* chromaticity diagram at b*=xa* ($3 \leq x \leq \infty$), such as C.I. Direct Yellow 86.

The total content of the dye represented by the general formula (1) and the yellow dye in the ink is within a range of from 0.1 to 30% by weight, preferably from 0.1 to 10% by weight based on the total weight of the ink.

When the dye represented by the general formula (1) and the yellow dye are used in combination, their proportions in the ink are suitably determined without any particular limitation. However, it is preferable to use the dye represented by the general formula (1) and the yellow dye in a weight ratio ranging from 5:1 to 1:1, preferably from 4:1 to 2:1 taking the reliability as to print quality when conducting continuous printing and long-term storage stability, and the water fastness, color tone and the like into consideration.

When the dye represented by the general formula (1) and the yellow dye are used at such a ratio that a* is near 0, the color tone of red and green, which are secondary colors, can also be improved, to say nothing of preferable yellow. The use of such a mixed dye according to the present invention can better improve the reliability as to print quality when conducting continuous printing, long-term storage stability, etc. than when producing, for example, a tint of a* being near 0 by using one kind of dye. It is hence preferable to use such a mixed dye.

It is also preferable to select a counter ion to the dye represented by the general formula (1) from ammonium and alkylamino ions, and to select a counter ion to the yellow dye having a SO$_3$H group as a main solubilizing group in the state of a free acid and having its position in the L*a*b* chromaticity diagram at b*=xa* ($3 \leq x \leq \infty$) from alkanolamino and alkali metal ions. The reason for this is not clearly known, but it may be that the solution stability of the dyes is improved.

It is further preferable that the ink according to the present invention should contain a monovalent alkali metal not contained in the dyes. The reason for this is considered to be that since the alkali metal not contained in the dyes acts as a counter ion to the dyes, and some synergistic effect thus takes place, the balance between reliability and water fastness is better improved.

The content of the monovalent alkali metal in the ink is within a range of from 0.01 to 10.0% by weight, preferably from 0.1 to 5% by weight, more preferably from 0.1 to 3% by weight.

The ink according to the present invention preferably has a pH of 9 or higher because the pH of 9 or higher is more advantageous to the reliability as to the print quality when conducting continuous printing, crusting, long-term storage stability, etc.

The ink according to the present invention contains a volatile base component such as ammonia or an alkylamine. Since these base components volatilize with time, it is preferable that the ink should contain urea or a urea derivative such as ethyleneurea, propyleneurea, thiourea or diethylurea as a component for covering up such a loss. The content of urea or the urea derivative in the ink is within a range of from 0.01 to 20% by weight, preferably from 0.1 to 15% by weight.

In order to improve an evenness of a solid print and a fixing ability, a penetrating agent such as alcohol or ether may be contained in the ink. The content of the penetrating agent in the ink is within a range of from 0.01 to 15% by weight, preferably from 0.01 to 10% by weight.

The liquid medium dissolving or dispersing the dyes therein, which is useful in the practice of the present invention, is preferably a mixed solvent of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; cyclic amide compounds such as 2-pyrrolidone and ε-caprolactam; and imide compounds such as succinimide.

The content of the water-soluble organic solvent in the ink is preferably within a range of generally from 1% to 40% by weight, more preferably from 3% to 30% by weight, based on the total weight of the ink.

The content of water in the ink is within a range of from 30 to 95% by weight. If the amount of water is less than 30% by weight, the solubility and the like of the dyes are deteriorated, and the viscosity of the resulting ink is also increased. It is hence not preferable to use water in such a small amount. On the other hand, if the amount of water is greater than 95% by weight, the vaporizing components are too great to sufficiently satisfy the crusting property.

In order to better improve the solution stability of the dyes in the ink, besides the above components, various additives may preferably be contained in the ink according to the present invention. More specifically, a volatile base component such as ammonia or an alkylamine may be contained in the ink without any problem. Besides, urea, urea derivatives and other various additives may be contained. Further, salts of a strong acid and a strong base, amines and the like may be contained as a pH adjustor. Besides the above components, additives such as surfactants, rust preventives, mildewproofing agents, antioxidants, vaporization accelerators, chelating agents and water-soluble polymers may be added as necessary.

Although the ink according to the present invention may be used as a common water-soluble writing utensil, it is particularly suitable for use in an ink-jet recording system of the type that an ink is ejected by thermal energy. This recording system has the feature that the ejection of the ink becomes extremely stable, and no satellite dots are generated. In this case, however, the thermal properties (for example, the specific heat, the coefficient of thermal expansion, the heat conductivity, etc.) of the ink may be controlled in some cases.

The ink according to the present invention is desirably controlled so as to have, as its own physical properties, a surface tension of 30 to 68 dyn/cm, preferably 30 to 50 dyn/cm and a viscosity of 15 cP or lower, preferably 10 cP or lower, more preferably 5 cP or lower as measured at 25° C. from the viewpoint of solving the problem of water fastness of the resulting printed images when recorded on plain paper or the like and at the same time, making the matching of the ink with an ink-jet head good.

As a preferred method and apparatus for conducting recording by using the ink according to the present invention, may be mentioned an ink-jet recording method and apparatus in which thermal energy corresponding to recording signals is applied to an ink within a recording head, and the ink is ejected by the thermal energy.

Figure 1:
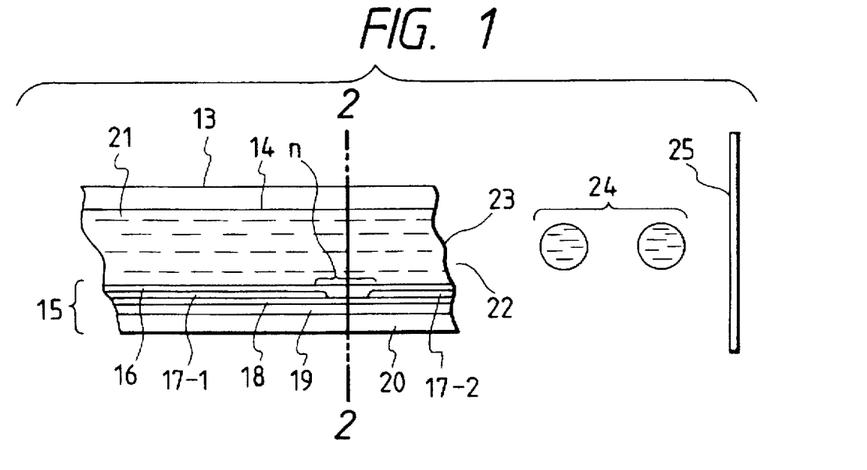
FIG. 1 is a longitudinal cross-sectional view of a head of an ink-jet recording apparatus.
Figure 2:
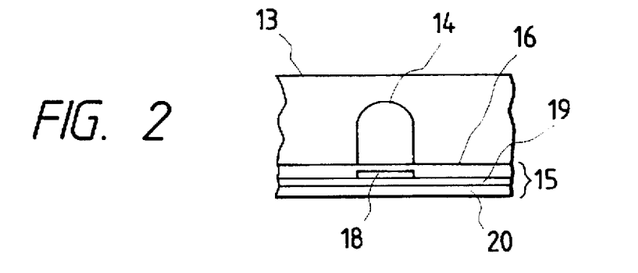
FIG. 2 is a transverse cross-sectional view of the head of the ink-jet recording apparatus.
Figure 3:
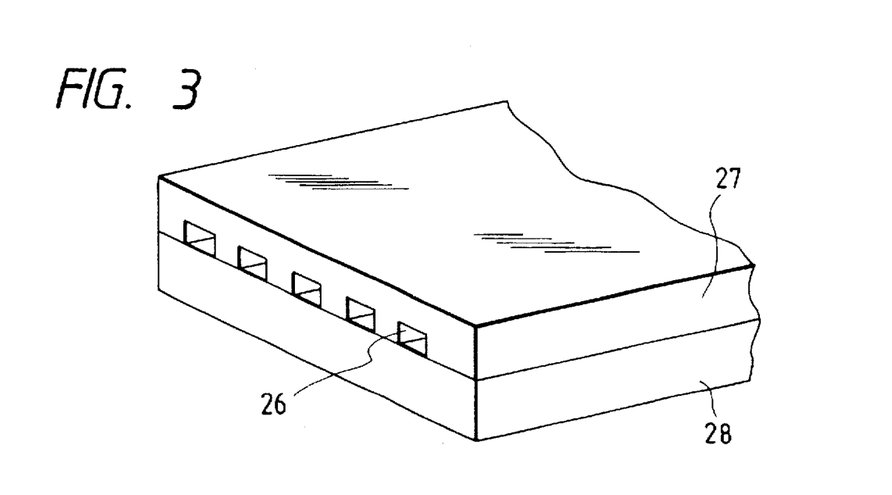
FIG. 3 is a perspective view of the appearance of a multi-head which is an array of such heads as shown in FIG. 1.

Examples of the construction of a head, which is a main component of such an apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawings show a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure (not illustrated).

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the orifice 22 to a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of ink, and FIG. 2 is a cross-sectional view taken along line 2—2 in FIG. 1.

Figure 4:
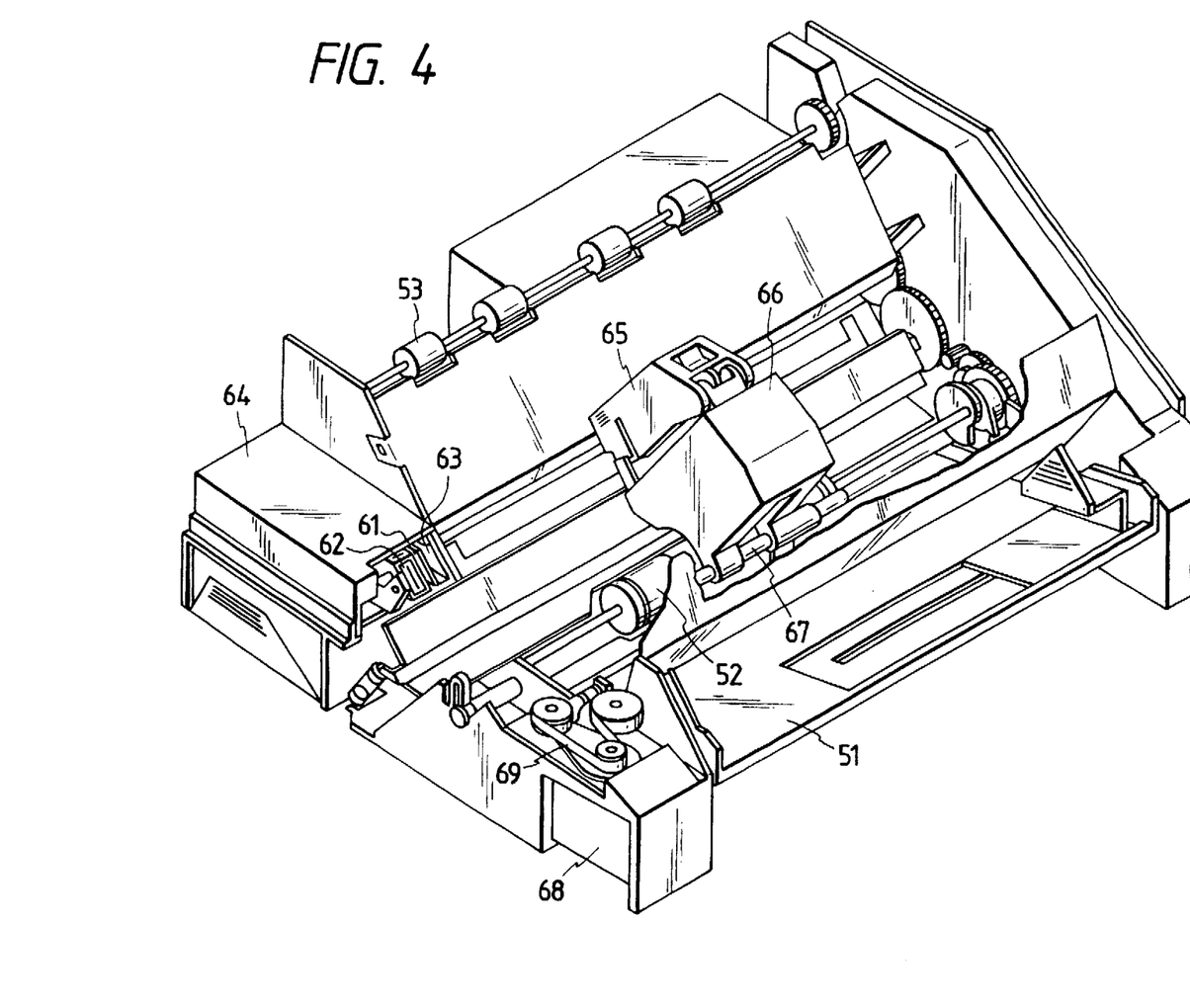
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes into the course through which the recording head is moved. Reference numeral 62 indicates a cap, which is provided at a home position adjacent to the blade 61, and is so constructed that it moves in a direction perpendicular to a direction in which the recording head is moved, and comes into contact with the face of ejecting openings to cap it. Reference numeral 63 denotes an ink-absorbing member provided adjoiningly to the blade 61 and, similar to the blade 61, held in such a form that it protrudes into the course through which the recording head is moved. The above-described blade 61, cap 62 and absorbing member 63 constitute an ejection-recovery portion 64, where the blade 161 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. AS a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
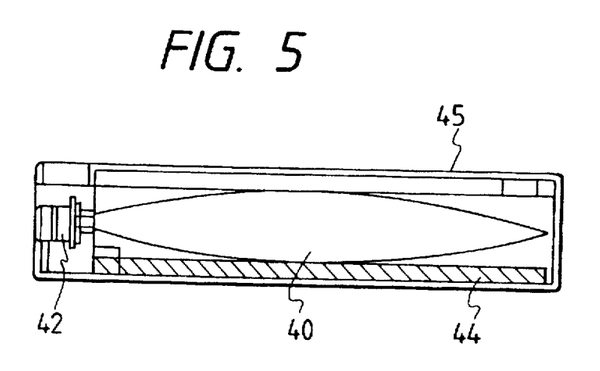
FIG. 5 is a longitudinal cross-sectional view of an ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact.

The ink-jet recording apparatus used in the present invention is not limited to the apparatus as described above in which the head and the ink cartridge are separately provided. Therefore, a device in which these members are integrally formed as shown in FIG. 6 can also be preferably used.

Figure 6:
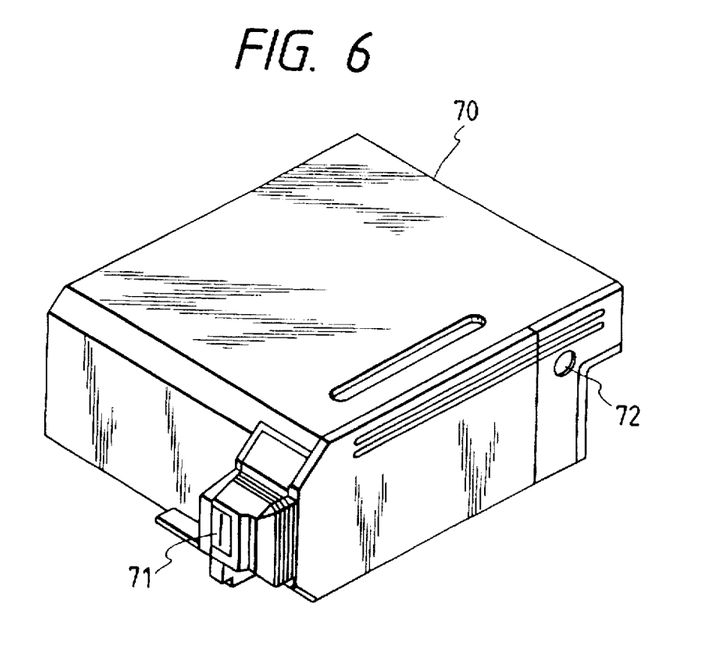
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane, cellulose or polyvinyl acetal is preferably used as a material for the ink-absorbing member.

Reference numeral 72 indicates an air passage for communicating the interior of the recording unit 70 with the atmosphere. This recording unit 70 is used in place of the recording head shown in FIG. 4, and is detachably installed on the carriage 66.

The present invention will hereinafter be described in more detail by the following Examples and Comparative Examples. Incidentally, all designations of "part" or "parts"

and "%" as will be used in the following examples mean part or parts by weight and % by weight unless expressly noted.

EXAMPLES 1 TO 4

After their corresponding components described below were mixed and thoroughly stirred into solutions, the resultant solutions were separately filtered under pressure through a "Fluoropore Filter" (trade name; product of Sumitomo Electric Industries, Ltd.) having a pore size of 0.45 µm, thereby preparing respective inks according to Examples 1 to 4. These inks were adjusted to a pH of about 9.5

Ink Composition of Example 1:

| | |
|---|---|
| Acetylenol EH (trade name, product of Kawaken Fine Chemicals Co., Ltd.) | 1 part |
| Urea | 8 parts |
| Glycerol | 8 parts |
| Ethylene glycol | 8 parts |
| Water | 72.1 parts |
| C.I. Direct Yellow 86 (x = 7.3) | 0.5 part |
| Dye (1) | 1.7 parts |
| Lithium hydroxide | 0.2 part |
| Triethanolamine | 0.5 part. |

(Note) x in the yellow dye means a value of a position of $b^* = xa^*$ on an $L^*a^*b^*$ chromaticity diagram when conducting printing with an ink containing the dye at a concentration of 2.5% on paper for copying, 4024 (trade name, product of Xerox Co.) to measure the chromaticity of the resulting print.

Ink Composition of Example 2:

| | |
|---|---|
| Ethylene oxide-propylene oxide copolymer (MH 50, trade name, product of Asahi Denka Kogyo K.K.) | 1 part |
| Thiourea | 5 parts |
| 2-Pyrrolidone | 8 parts |
| Triethylene glycol | 8 parts |
| Water | 74.8 parts |
| C.I. Direct Yellow 86 (x = 7.3) | 0.8 part |
| Dye (2) | 1.7 parts |
| Ammonium sulfate | 0.3 part |
| Sodium hydroxide | 0.4 part. |

Ink Composition of Example 3:

| | |
|---|---|
| Acetylenol EH (trade name, product of Kawaken Fine Chemicals Co., Ltd.) | 1 part |
| Urea | 8 parts |
| Diethylene glycol | 10 parts |
| Thiodiglycol | 10 parts |
| C.I. Direct Yellow 86 (x = 7.3) | 0.5 part |
| Dye (3) | 1.7 parts |
| Water | 67.5 parts |
| Diethanolamine | 0.8 part |
| Lithium acetate | 0.5 part. |

Ink Composition of Example 4:

| | |
|---|---|
| Acetylenol EH (trade name, product of Kawaken Fine Chemicals Co., Ltd.) | 1 part |
| Urea | 8 parts |
| Glycerol | 8 parts |
| Ethylene glycol | 8 parts |
| Water | 72.1 parts |
| C.I. Direct Yellow 86 (x = 7.3) | 0.5 part |
| Dye (1) | 1.7 parts |
| Sodium hydroxide | 0.2 part |
| Triethanolamine | 0.5 part. |

Comparative Example 1:

In the composition of Example 1, Dye (1) was omitted, and instead, purified water was supplied to prepare an ink.

Comparative Example 2:

In the composition of Example 1, C.I. Direct Yellow 86 (x=7.3) was omitted, and instead, purified water was supplied to prepare an ink.

Comparative Example 3:

In the composition of Example 1, C.I. Direct Yellow 86 (x=7.3) was omitted, and instead, Dye (2) was supplied to prepare an ink.

Comparative Example 4:

In the composition of Example 1, Dye (1) was omitted, and instead, C.I. Acid Yellow 23 was supplied to prepare an ink.

Comparative Example 5:

In the composition of Example 1, Dye (1) and C.I. Direct Yellow 86 (x=7.3) were omitted, and instead, C.I. Direct Yellow 142 was supplied to prepare an ink.

<Methods and Standards for Evaluation>

(1) Evaluation of chromaticity:

Solid printing was conducted with an ink to be tested on paper for copying, 4024 (trade name, product of Xerox Co.) to measure a chromaticity of the resulting print by means of a high-speed spectrophotometer, CMS-500 Model (trade name, manufactured by K.K. Murakami Shikisai Gijutsu Kenkyusho), whereby a position on the chromaticity diagram was confirmed to rank the chromaticity as AA, A or B in order from that near the neutral position ($a^*=0$).

AA: $-2 \leq a^* \leq 2$, $b^* \geq 0$;

A: $-10 \leq a^* \leq -2$, $2 \leq a^* \leq 10$, $b^* \geq 0$;

B: $a^* \leq -10$, $10 \leq a^*$, $b^* \geq 0$.

(2) Evaluation of water fastness:

After an ink to be tested was charged into a printer to print English characters and numerals and solid print areas on commercially-available acid paper, the printer was stopped and the resulting print sample was left over for at least 1 hour, followed by measurement of the Optical density of the print by a "Macbeth RD915" (trade name; manufactured by Macbeth Company). After the print sample was then immersed for 3 minutes in a container filled with water, it was allowed to stand and air-dried to measure its optical density again, whereby the percent retention of the optical density was determined in accordance with the following equation. The water fastness was ranked in accordance with the following standard:

Percent retention of optical density =

$$\frac{\text{Optical density after immersion test}}{\text{Optical density before immersion test}} \times 100$$

A: Percent retention of optical density not lower than 80%.

B: Percent retention of optical density not lower than 60% but lower than 80%;

C: Percent retention of optical density lower than 60%.

(3) Evaluation of print quality after continuous printing (evaluation of durability):

Continuous printing was conducted with an ink to be tested by a printer for 24 hours in a thermostatic chamber at 35° C., and the print quality after this was visually observed to rank it in accordance with the following standard:

A: Normal printing could be conducted;

B: Printing could be conducted without problems in actual use though print irregularity was somewhat observed;

C: Ejection failure or print irregularity was observed.

(4) Evaluation of clogging tendency (recovery property from crusting):

An ink-jet printer, BJC600J (trade name; manufactured by Canon Inc.) charged with an ink to be tested was left over for 1 month in a thermostatic chamber at 35° C., and then for 24 hours at room temperature. After conducting recovery operation (sucking operation by pumping), printing was conducted. The clogging tendency was ranked in accordance with the following standard:

A: Normal printing state was recovered by conducting recovery operation at most 5 times;

B: Normal printing state was recovered by conducting recovery operation 6 to 10 times;

C: Ejection failure or print irregularity was caused even after conducting recovery operation 6 to 10 times.

(5) Evaluation of long-term storage stability at high temperature:

An ink to be tested was placed in a hermetically sealed bottle and left therein over 3 months in an environment controlled at 50° C. Thereafter, the ink sample was filtered through filter paper to evaluate the ink as to storage stability by visually observing whether aggregate occurred or not and rank it in accordance with the following standard:

AA: No aggregate was observed;

A: Aggregate was somewhat observed at a level causing no problem from the viewpoint of printing;

B: Aggregate was somewhat observed, and the resulting print slightly blurred;

C: Aggregate was observed to a great extent, and ejection failure was caused.

(6) Evaluation of long-term storage stability at low temperature:

An ink to be tested was placed in a hermetically sealed bottle and left therein over 3 months in an environment controlled at 5° C. Thereafter, the ink sample was filtered through filter paper to evaluate the ink as to storage stability by visually observing whether aggregate occurred or not and rank it in accordance with the following standard:

AA: No aggregate was observed;

A: Aggregate was somewhat observed at a level causing no problem from the viewpoint of printing;

B: Aggregate was somewhat observed, and the resulting print slightly blurred;

C: Aggregate was observed to a great extent, and ejection failure was caused.

The evaluation results as to the above Examples and Comparative Examples are shown in Table 1.

TABLE 1

|   |   | Example | | | | Comparative Example | | | | |
|---|---|---|---|---|---|---|---|---|---|---|
|   |   | 1 | 2 | 3 | 4 | 1 | 2 | 3 | 4 | 5 |
| (1) | Chromaticity | AA | AA | AA | AA | A | A | A | AA | AA |
| (2) | Water fastness | A | A | A | A | B | A | A | C | C |
| (3) | Print quality after continuous printing | A | A | A | A | B | B | B | A | A |
| (4) | Clogging tendency | A | A | A | A | A | B | B | A | A |
| (5) | Long-term storage at high temperature | AA | AA | AA | AA | AA | AA | AA | AA | C |
| (6) | Long-term storage at low temperature | AA | A | AA | A | AA | B | B | AA | A |

According to the present invention, as described above, there can be provided inks which have excellent durability and long-term storage stability, can improve the water fastness and color tone of the resulting recorded images, and permit recording with high reliability without the least problem even when used in an ink-jet recording system.

According to the ink-jet recording method and apparatus of the present invention using the inks described above, recording can be conducted with high reliability in that resistance to clogging at orifices is excellent.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A yellow ink comprising at least two yellow dyes and a liquid medium dissolving or dispersing the dyes therein, wherein the ink comprises a dye represented by the following general formula (1) in the state of a free acid, and a yellow dye having a $SO_3H$ group as a main solubilizing group in the state of a free acid and having its position in the $L^*a^*b^*$ chromaticity diagram at $b^* = xa^*$ ($3 \leq x \leq \infty$):

(1)

wherein Ar and $Ar_1$ are independently an aryl group or a substituted aryl group, at least one of which has at least one substituent group selected from the group consisting of COOH and COSH, J and $J_1$ are independently a group selected from the group consisting of groups represented by the general formulae

(2)

(3)

and

(4)

in which $R_5$ is a radical selected from the group consisting of H, alkyl groups, substituted alkyl groups, alkoxy groups, halogens, CN, a ureido group and $NHCOR_6$ ($R_6$ being a radical selected from the group consisting of H, alkyl groups, substituted alkyl groups, aryl groups, substituted aryl groups, aralkyl groups and substituted aralkyl groups), T is an alkyl group, W is a radical selected from the group consisting of H, CN, $CONR_{10}R_{11}$, pyridinium and COOH, (m) is an alkylene chain having 2 to 8 carbon atoms, and B is a radical selected from the group consisting of H, alkyl groups and COOH, $R_1$, $R_2$, $R_3$, $R_4$, $R_{10}$ and $R_{11}$ are independently a radical selected from the group consisting of H, alkyl groups and substituted alkyl groups, L is a divalent organic bonding group, n is 0 or 1, X is a carbonyl group or a group selected from the group consisting of groups represented by the general formulae (5)

(6)

and (7)

in which Z is a group selected from the group consisting of $OR_7$, $SR_7$ and $NR_8R_9$, Y is a radical selected from the group consisting of H, Cl, CN and Z, E is a radical selected from the group consisting of Cl and CN, and $R_7$, $R_8$ and $R_9$ are independently a radical selected from the group consisting of H, alkenyl groups, substituted alkenyl groups, alkyl groups, substituted alkyl groups, aryl groups, substituted aryl groups, aralkyl groups and substituted aralkyl groups, or $R_8$ and $R_9$ form a 5- or 6-membered ring together with the nitrogen atom to which they are bonded, with the proviso that (1) Ar and $Ar_1$ have at least two groups selected from COOH and COSH where they have no $SO_3H$ group, or (2) Ar and $Ar_1$ have groups selected from COOH and COSH of at least the same number as the number of $SO_3H$ groups where they have one or more $SO_3H$ groups.

2. The ink according to claim 1, wherein the dye represented by the general formula (1) has at least one $SO_3H$ group as a water-soluble group and at least the same number of COOH groups as the number of $SO_3H$ groups in the dye.

3. The ink according to claim 1, wherein the dye represented by the general formula (1) has no $SO_3H$ group and contains at least two COOH groups.

4. The ink according to claim 1, wherein the dye represented by the general formula (1) has at least three COOH groups.

5. The ink according to claim 1, wherein the dye represented by the general formula (1) has a structure that at least one of Ar and $Ar_1$ has at least one COOH group.

6. The ink according to claim 1, wherein the dye represented by the general formula (1) has a structure that Ar and $Ar_1$ each have at least one COOH group.

7. The ink according to claim 1, wherein the dye represented by the general formula (1) has a structure that Ar and $Ar_1$ each have at least two COOH groups.

8. The ink according to claim 1, wherein the dye represented by the general formula (1) has a structure that both Ar and $Ar_1$ are dicarboxyphenyl groups.

9. The ink according to claim 1, wherein the dye represented by the general formula (1) has a structure that X is a group represented by the general formula (5), and Z in the general formula (5) is a group selected from the group consisting of $NHC_2H_4OH$, $N(C_2H_4OH)_2$, NHR (R being an alkyl group having 1 to 6 carbon atoms) and a morpholino group.

10. The ink according to claim 1, wherein the dye represented by the general formula (1) has a counter ion selected from the group consisting of ammonium and alkylamino ions.

11. The ink according to claim 1, wherein the yellow dye having a $SO_3H$ group as a main solubilizing group in the state of a free acid and having its position in the. L*a*b* chromaticity diagram at b*=xa* ($3 \leq x \leq \infty$) has a symmetrical structure inserted with an organic bonding group.

12. The ink according to claim 1 or 11, wherein the yellow dye having a $SO_3H$ group as a main solubilizing group in the state of a free acid and having its position in the L*a*b* chromaticity diagram at $b^*=xa^*$ ($3 \leq x \leq \infty$) is a dye having a structure represented by the following general formula (8) in the state of a free acid:

(8)

wherein $A_1$ is $C_nH_{2n+1}$ or $OC_nH_{2n+1}$ where n is an integer of 1 to 5, and $B_1$ is where $X_1$ is a sulfonic group; $X_2$ and $X_3$ are independently a radical selected from the group consisting of carboxyl, hydroxyl and amino groups, and hydrogen, at least one of $X_2$ and $X_3$ having a $SO_3H$ group.

13. The ink according to claim 12, wherein in the dye represented by the general formula (8), $A_1$ is $CH_3$, and $B_1$ is where $X_1$ is a sulfonic group.

14. The ink according to claim 12, wherein the dye represented by the general formula (8) has a counter ion selected from the group consisting of alkylamino and alkali metal ions.

15. The ink according to claim 1, wherein the total content of the dye represented by the general formula (1) and the yellow dye having a $SO_3H$ group as a main solubilizing group in the state of a free acid and having its position in the L*a*b* chromaticity diagram at $b^*=xa^*$ ($3 \leq x \leq \infty$) in the ink is within a range of from 0.1 to 30% by weight based on the total weight of the ink.

16. The ink according to claim 1, wherein the total content of the dye represented by the general formula (1) and the yellow dye having a $SO_3H$ group as a main solubilizing group in the state of a free acid and having its position in the L*a*b* chromaticity diagram at $b^*=xa^*$ ($3 \leq x \leq \infty$) in the ink is within a range of from 0.1 to 10% by weight based on the total weight of the ink.

17. The ink according to claim 1, wherein the weight ratio of the dye represented by the general formula (1) to the yellow dye having a $SO_3H$ group as a main solubilizing group in the state of a free acid and having its position in the L*a*b* chromaticity diagram at $b^*=xa^*$ ($3 \leq x \leq \infty$) contained in the ink is within a range of from 5:1 to 1:1.

18. The ink according to claim 1, wherein the weight ratio of the dye represented by the general formula (1) to the yellow dye having a $SO_3H$ group as a main solubilizing group in the state of a free acid and having its position in the L*a*b* chromaticity diagram at $b^*=xa^*$ ($3 \leq x \leq \infty$) contained in the ink is within a range of from 4:1 to 2:1.

19. The ink according to claim 1, which further comprises a monovalent alkali metal component not contained in the dyes.

20. The ink according to claim 1, wherein the pH of the ink is at least 9.

21. The ink according to claim 1, which further comprises at least one of urea and urea derivatives.

22. The ink according to claim 1, which further comprises a penetrating agent.

23. An ink-jet recording method comprising ejecting an ink out of an orifice in accordance with recording signals to conduct recording on a recording medium, wherein said ink is the ink according to claim 1.

24. The ink-jet recording method according to claim 23, wherein the ink is ejected by applying thermal energy to the ink.

25. A recording unit comprising an ink container portion with an ink held therein and a head from which the ink is ejected, wherein said ink is the ink according to claim 1.

26. The recording unit according to claim 25, wherein the head is a head which applies thermal energy to the ink to eject the ink.

27. The recording unit according to claim 25, wherein the ink container portion comprises an ink-absorbing member.

28. The recording unit according to claim 25 or 27, wherein the ink container portion is formed of polyurethane, cellulose or polyvinyl acetal.

29. An ink cartridge comprising an ink container portion with an ink held therein, wherein said ink is the ink according to claim 1.

30. The ink cartridge according to claim 29, wherein the ink container portion is formed of a polyolefin at its surface with which the ink comes into contact.

31. An ink-jet recording apparatus comprising a recording unit having an ink container portion with an ink held therein and a head from which the ink is ejected, wherein said ink is the ink according to claim 1.

32. The ink-jet recording apparatus according to claim 31, wherein the head is a head which applies thermal energy to the ink to eject the ink.

33. The ink-jet recording apparatus according to claim 31, wherein the ink container portion comprises an ink-absorbing member.

34. The ink-jet recording apparatus according to claim 31 or 33, wherein the ink container portion is formed of polyurethane, cellulose or polyvinyl acetal.

35. An ink-jet recording apparatus comprising a recording head for ejecting an ink, an ink cartridge having an ink container portion with the ink held therein, and an ink feeder for feeding the ink from the ink cartridge to the recording head, wherein said ink is the ink according to claim 1.

36. The ink-jet recording apparatus according to claim 35, wherein the recording head is a head which applies thermal energy to the ink to eject the ink.

37. The ink-jet recording apparatus according to claim 35, wherein the ink container portion is formed of a polyolefin at its surface with which the ink comes into contact.

* * * * *

UNITED STATES PATENT AND TRADEMARK OFFICE
CERTIFICATE OF CORRECTION

PATENT NO. : 5,728,201
DATED : March 17, 1998
INVENTOR(S) : ERIKO SAITO, ET AL.

It is certified that error appears in the above-identified patent and that said Letters Patent is hereby corrected as shown below:

COLUMN 3:

Line 20, "Consisting" should read --consisting--.

Line 49, "$NR_8SR_9,$" should read --$NR_8R_9,$--.

COLUMN 17:

Line 53, "blade 161" should read --blade 61--.

Signed and Sealed this

Twenty-fourth Day of November, 1998

Attest:

BRUCE LEHMAN

Attesting Officer　　　Commissioner of Patents and Trademarks